United States Patent
Van Swaay

[15] 3,683,671
[45] Aug. 15, 1972

[54] MEASURING SYSTEM INCLUDING THERMAL CONDUCTIVITY DETECTOR MEANS

[72] Inventor: Maarten Van Swaay, Manhattan, Kans.

[73] Assignee: Kansas State University Research Foundation, Manhattan, Kans.

[22] Filed: Sept. 14, 1970

[21] Appl. No.: 72,068

[52] U.S. Cl..............73/27 R, 73/88.5 R, 73/141 R, 73/359, 73/362 AR, 73/398 AR, 23/254 E, 323/75 H, 323/75 N, 324/57 B, 324/62 B, 324/65 B, 328/165
[51] Int. Cl..........................G01n 27/18, G05f 1/16
[58] Field of Search......73/23.1, 27, 88.5, 136 R, 141 R, 73/359–362, 398 AR; 23/254 E, 255 E; 340/237 R; 323/75 H, 75 N; 324/57, 62, 65; 328/165

[56] References Cited

UNITED STATES PATENTS

| | | |
|---|---|---|
| 3,414,834 | 12/1968 | Stubbs......................330/69 |
| 3,480,397 | 11/1969 | Baumgartel..............23/232 E |
| 3,568,044 | 3/1971 | Elazar......................324/62 R |
| 3,576,491 | 4/1971 | Thornton.................324/62 R |

*Primary Examiner*—Richard C. Queisser
*Assistant Examiner*—C. E. Snee, III
*Attorney*—Dawson, Tilton, Fallon & Lungmus

[57] ABSTRACT

A reference thermal conductivity detector and a measuring thermal conductivity detector are connected in different branches of an electrical bridge circuit. The bridge is excited at one power node by a clamped square wave symmetrical about a base voltage line; and the other power node is excited by a feedback circuit sensing the signal at the signal nodes and maintaining the average value of the common mode signal at zero relative to the base line. The output signal taken from the signal nodes is fed to a demodulator circuit for generating an output signal representative of the thermal conductivity of the sample being sensed. Delay circuits are provided for inhibiting the operation of the demodulator during those periods when the polarity of the bridge input power signal is changing.

9 Claims, 5 Drawing Figures

INVENTOR
MAARTEN VAN SWAAY
BY Dawson, Tilton,
Fallon and Lungmus
ATTORNEYS.

MEASURING SYSTEM INCLUDING THERMAL CONDUCTIVITY DETECTOR MEANS

BACKGROUND OF THE INVENTION

1. Field of the Invention

The present invention relates to measuring systems; and more particularly, it relates to measuring systems employing thermal conductivity detectors such as are used in gas chromatography.

One of the techniques used in gas chromatography introduces a sample of volatile material into a carrier gas stream percolating through a conduit containing a nonvolatile solvent which is coated on a finely divided inert support. The effective velocity of various components of the sample depends on the relative affinity of those components for the nonvolatile solvent, so that different components reach the end of the conduit at different times after simultaneous introduction. Passage of a sample component through a sensor mounted at the downstream end of the conduit may be detected by the change in thermal conductivity of the carrier gas in the presence of a sample component. In a common configuration, the sensor consists of one or more thermally heated elements, the resistance of which changes with temperature. The temperature of the sensors in turn is controlled in pat by the thermal conductivity of the gas flowing past it. The sensor elements, which may be filaments or thermistors, usually are connected in one or more arms of a Wheatstone bridge circuit, so that for each sensor in the sample-containing gas there will be a corresponding sensor mounted in a reference stream of pure carrier gas.

The carrier gas alone, having a relatively large heat conductance will cool the reference sensors at one rate, whereas the sample gas mixing with the carrier will cool the measuring sensors at a substantially smaller rate. The difference in cooling rate will be reflected in a different resistivity between the reference and measuring detectors, and this will, in turn, be reflected in a change in bridge output signal representative of the thermal conductivity of the sample gas. Although the present invention has broader application than gas chromatography alone and may be used in any system which employs thermally unbalanced sensors in electrical bridge circuits of the type just described, the invention will be illustrated in the setting of a gas chromatographic system.

2. Known System

Conventional operation of thermal conductivity detectors in gas chromatography is based on the use of stabilized direct current to energize the bridge. The dc unbalance produced by temperature changes of the sensing elements is then recorded as a measure of the thermal conductivity of the gas. The unbalanced signal is very small of the order of a few microvolts, and normally, chopper-stabilized amplifiers are used to record the output signal. There is a desire on the part of persons working in this art to achieve an improved detection limit compared to that which may be achieved with dc excitation of the bridge.

It has been reported that detector bridges have been energized with sinusoidal input power. However, the filament detector elements produce both a phase shift and a third harmonic component at the output which adversely affected the bridge balance. The phase shift could be reduced by incorporating suitable reactive elements, and harmonics may be removed with filters. However the data reported do not indicate any improvement in the detection limit.

I have found that the sensing elements owing to the inherent small heat capacity of minor and rapid fluctuations of the power supplied to the bridge may produce noticeable temperature variations which may produce electrical noise at the bridge output. Further, such power changes may thermally expand and contract filament sensors and thereby produce mechanical vibrations which, in turn, may adversely affect the gas flow and temperature distribution around the filaments. Mechanical vibrations of this type may also arise due to electromagnetic forces acting between adjacent turns of the filament.

SUMMARY

In the present invention, a multivibrator circuit generates a square-wave signal to excite one power terminal of a bridge circuit with a square-wave current. The bridge circuit includes two reference thermal conductivity detectors and two measuring thermal conductivity detectors. A feedback circuit, sensing the voltage appearing at the signal terminals of the bridge, excites the other power terminal of the bridge to maintain the average value of the bridge output signal at ground potential or some other convenient reference level. With this type of "push-pull" supply for energizing the detector bridge, the common-mode signal at the bridge input is maintained at less than about 10mV. Thus, a differential amplifier with a common-mode rejection ratio of $10^6:1$ is capable of responding to an unbalance signal of the order of $10^{-9}$ volts.

The output signal taken from the bridge is fed to a demodulator circuit for generating an output signal representative of the thermal conductivity of the sample. Delay circuits are provided for inhibiting the operation of the demodulator during those periods when the polarity of the bridge input power signal is changing to prevent transients from affecting the measurement.

Thus, the present invention permits the operation of thermal conductivity detectors with a square-wave bridge supply current and extends the detection limit of the system. Means are provided to eliminate or substantially reduce the common mode signal. The resulting output signal allows amplification without the need for low-level choppers. With phase-locked demodulation of the amplified signal, bridge unbalance signals of the order of $10 \times 10^{-9}$ volts can be detected. This represents a performance level which exceeds the requirements of presently available detector cells, which produce noise levels of the order of $100 \times 10^{-9}$ volts. Air and other permanent gases can be reliably analyzed at levels of 0.02 microliters with detection limits of the order of 0.002 microliters. Such performance gives the inventive system practical utility in the field of air pollution detection.

Further, the present system eliminates the electrical noise and mechanical vibration that have been found to be inherent in exciting bridge circuits with sinusoidal voltages.

Other features and advantages of the present invention will be apparent to persons skilled in the art from the following detailed description of a preferred embodiment wherein identical reference numerals will refer to like parts in the various views.

THE DRAWING

DETAILED DESCRIPTION

Figure 1:
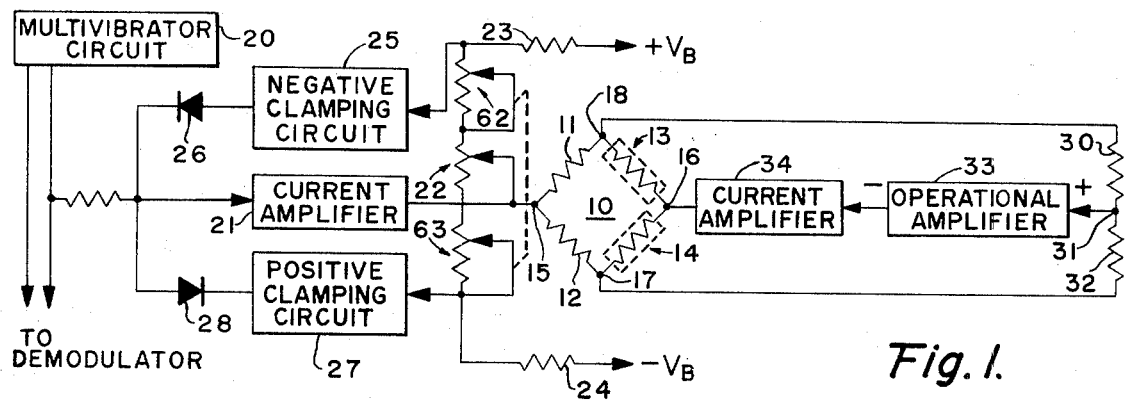
FIG. 1 is a circuit schematic, partially in block diagram form, of the circuitry which excites a bridge circuit including thermal conductivity detectors according to the present invention.

In FIG. 1, there is shown, partially in block diagram form, a simplified schematic of the circuitry which energizes or excites an electrical bridge circuit generally designated by reference numeral 10 and arranged in the form of a Wheatstone bridge having four separate branches. Although it is preferred to use two reference detectors and two measuring detectors to achieve greater sensitivity, the illustrated embodiment employs only one of each for simplicity. Thus, the illustrated bridge includes two fixed precision resistors 11 and 12. The two other branches of the bridge 10 contain thermal conductivity sensors or detectors, and these are designated respectively 13 and 14. The detectors 13 and 14 may be thermistors or filaments, depending on the application or test. In the application of the invention to gas chromatography, one of the thermal conductivity detectors 13 or 14 would be incorporated into a conduit containing the carrier gas and therefore serve as the reference detector; whereas the other detector of the pair would be incorporated into a conduit through which both the carrier gas and the volatilized sample are passed. Alternatively, if two reference sensors and two measuring sensors are used, the measuring sensors would be in opposite branches of the bridge.

The diagonally opposite nodes 15 and 16 of the bridge 10 will sometimes herein be referred to as the power nodes, and the other two nodes designated 17 and 18 are sometimes herein referred to as the signal nodes, since the output signal is taken from these nodes.

At the left hand side of FIG. 1 there is a multivibrator circuit 20 which generate a symmetrical output square wave having alternate positive and negative half cycles of equal time duration. The output of the multivibrator circuit 20 is connected through a current amplifier 21 to the input power node 15 on the bridge circuit 10 and to the movable arm of a variable resistor 22. The fixed terminals of the resistor 22 are connected respectively to one terminal and to the movable arm of variable resistors 62 and 63. The other terminals of resistors 62 and 63 are connected respectively to fixed resistors 23 and 24 which are, in turn, connected respectively to the positive and negative terminals of a reference voltage supply which in the present case may also be the power supply and is thus designated $V_B$.

A negative clamping circuit 25 and a diode 26 are connected in series between the input of the current amplifier 21 and the junction between resistors 62 and 23. A second series circuit consisting of a positive clamping circuit 27 and a diode 28 is connected in series between the input of the current amplifier 21 and the junction between the resistors 63 and 24. The cathode of the diode 26 and the anode of the diode 28 are connected in common to the input of the current amplifier 21.

The circuit including the clamping circuit 25 and the diode 26 serves as a clamp on the negative voltage which excites the bridge circuit, and the circuit including the clamping circuit 27 and diode 28 serves as a clamp on the positive voltage which excites the bridge circuit. For convenience, it will be assumed that the output of the multivibrator circuit is symmetrical relative to zero volts or ground, although a system common or other reference voltage may be used. In operation, when the output of the multivibrator circuit 20 goes positive, the current amplifier 21 will follow it to produce the same voltage at the node 15 of the bridge circuit 10. Initially, the diode 28 is reverse-biased by the positive clamping circuit 27. However, when the voltage at bridge input node 15 exceeds a value $-(-V_B) \cdot R_p/R_{24}$, the output of clamping circuit 27 will go negative, thereby forward biasing diode 28, which prevents further positive excursion of bridge input node 15 by limiting the input to current amplifier 21. $R_p$ represents the sum of those parts of resistors 22 and 63 which are inserted between the bridge node 15 and the negative input terminal of clamping circuit 27, and $R_{24}$ is the value in ohms of resistor 24. Thus the input to the node 15 of the bridge 10 will become clamped at a predetermined positive voltage. Similarly, on the negative half cycle of a multivibrator circuit 20, the diode 26 is reverse biased by the amplifier 25 until a point is reached at which a change in the output of amplifier 25 forward biases diode 26; at that time, the input voltage to the current amplifier 21 becomes clamped at a predetermined negative level.

The diode 28 is reverse-biased when the output of the multivibrator circuit is negative, so that the clamping circuit 27 has no effect during negative half cycles of the multivibrator; similarly, during positive half cycles of the multivibrator 20, the diode 26 is revere biased, so that the clamping circuit 25 has no effect on the input voltage to the current amplifier 21 during positive half cycles.

The variable resistor 22 is used to balance the input voltage to the bridge 10, and variable resistors 62 and 63 are used to adjust the clamping levels.

The output signal terminal 18 of the bridge 10 is connected through a resistor 30 to a summing junction 31; and the output node 17 of the bridge 10 is connected through a resistor 32 to the same summing junction. The summing junction 31 forms one input to an operational amplifier 33, the other input of which is referenced to ground. The output of the voltage amplifier 33 feeds a current amplifier 34, the output of which is connected to the power node 16 of the bridge 10.

The signal at the summing unction 31 represents the sum of the output signals at the nodes 17 and 18 of the bridge circuit 10. Amplifier 33 is a high-gain amplifier which inverts the polarity of the input signal, so that any small positive excursion of the summing junction 31 relative to ground produces a large negative excursion at the output of amplifier 33, which in turn produces a large negative excursion of bridge node 16. This negative excursion of bridge node 16 in turn causes a corresponding negative excursion at the bridge output terminals 17 and 18, hence, of summing junction 31, counter-acting the initial positive excursion at that point. In summary, the output of amplifier 33 controlling the voltage at bridge signal node 16 will vary in such a way as to maintain the voltage at summing junction 31 representing the common mode output signal at bridge nodes 17 and 18 within a few millivolts of reference ground. The common mode signal at bridge output nodes 17 and 18 is thereby substantially reduced. Thus, the bridge is excited at its power terminals with a square wave which is symmetrical about ground due to the reduction or elimination of the common mode signal, the power signal reversing polarity at each half cycle.

In practice, it has been found that the common mode signal at the bridge output terminals can be limited to less than 10 millivolts. Under these conditions, a differential amplifier with a common mode rejection ratio of $10^6$:1 is capable of responding to an unbalance signal of the order of $10^{-9}$ volts the "unbalance" signal being produced when the detectors are measuring thermal conductivity and, therefore, are unbalanced.

Figure 2:
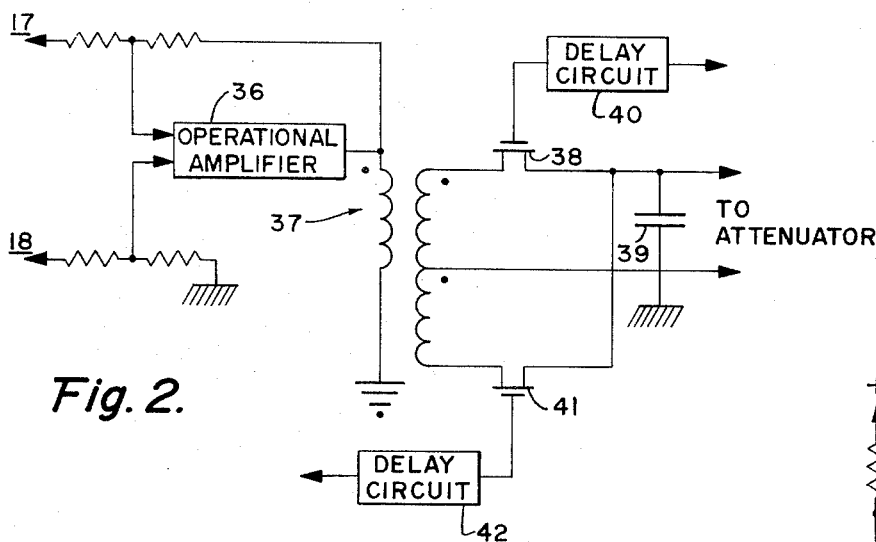
FIG. 2 is a more detailed circuit schematic diagram of the measuring portion of the inventive system.

Turning now to FIG. 2, the output terminals of the bridge circuit 10 are again designated 17 and 18, and they are fed via suitable dc voltage divider networks to the input of an operational amplifier 36, the output of which feeds the primary terminal of a transformer generally designated by reference numeral 37. The secondary of the transformer 37 has a center tap which is connected to ground. One output terminal of the transformer 32 is connected to a signal input of an FET switch 38, the output of which is connected to a filtering capacitor 39 and the gate of which is connected through a delay circuit 40 to the multivibrator circuit 20.

The other portion of the secondary winding of transformer 32 is connected to the signal input of a second FET switch 41 having its output terminal connected to the capacitor 39 and its gate connected to a delay circuit 42 which is also connected to the multivibrator circuit 20. During a positive half cycle, the multivibrator circuit 20 actuates the switch 38 and causes it to conduct a predetermined time (caused by the delay circuit 40) after the leading edge of the output waveform goes positive. Similarly, during the negative half cycle of the output signal of the multivibrator circuit 20, the switch 41 is caused to conduct through delay circuit 42. Thus, there is built up at the capacitor 39 a signal which represents the average rectified value the measured signal free of the common mode signal. As mentioned, the function of the delay circuits 40 and 42 is to inhibit coupling of the output signal to the capacitor 39 (or other output) until the common mode signal has been reduced to zero by the feedback circuit which energizes the power terminal 16 of the bridge. That is, there is some delay inherent in the feedback circuit (which includes the operational amplifier 32 and the current amplifier 34); and it is the function of the delay circuits and FET switches to demodulate the unbalance signal only after the feedback loop has had time to react to the change in polarity of the bridge supply voltage and substantially reduce the common mode signal.

Figure 3:
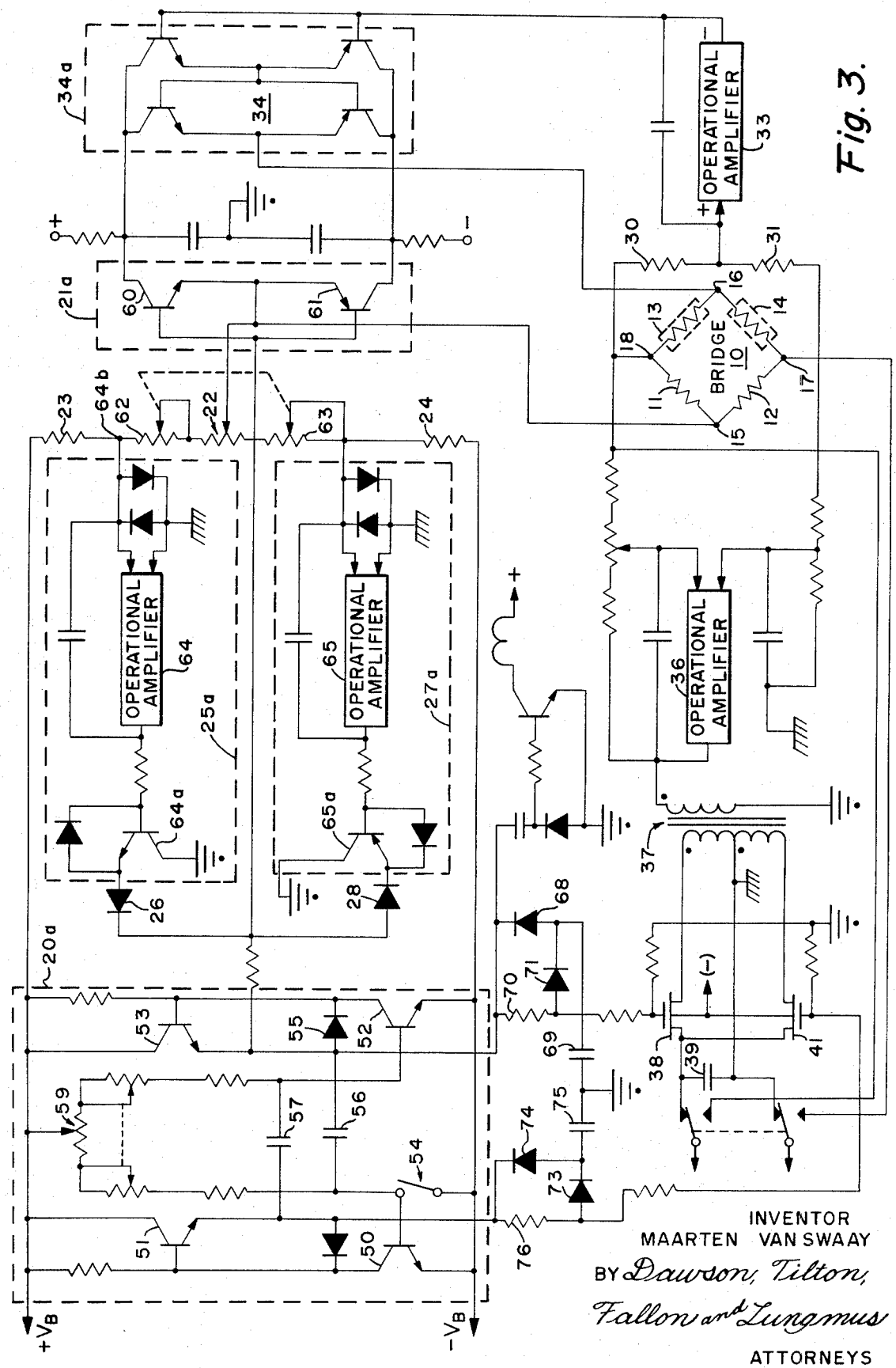
FIG. 3 is a detailed circuit schematic diagram of a measuring system incorporating the present invention.

Turning now to FIG. 3, the elements that have been described above are repeated in the context of a more detailed system schematic; and their description need not be repeated again. Further certain of the circuit details, such as biasing resistors and filtering capacitors, etc. have been added in connection with those elements already disclosed, but an understanding of the nature and function of these added elements will be readily apparent to persons skilled in the art.

Turning then to FIG. 3, in the upper left hand corner and enclosed within the dashed line 20a is a preferred arrangement for the multivibrator circuit 20. The multivibrator circuit 20 is of conventional design; however, emitter followers 51 and 53 have been added for current amplification. Although persons skilled in the art will readily appreciate the operation of the multivibrator from the circuit diagram, for convenience, the operation will be briefly summarized here. The base of a transistor 51 is connected to the collector of a transistor 50, and the base of a transistor 53 is connected to the collector of a transistor 52. A hand operated switch 54 is connected between the base of the transistor 50 and the negative power supply ($+V_B$). The output of the multivibrator circuit which feeds the previously-described current amplifier 21 (shown in dashed line 21a) of FIG. 1 is taken from the emitter of transistor 53.

In operation, assuming that the transistor 52 is conducting, its collector will be at a negative voltage and the diode 55 connected between the collector of transistor 52 and the emitter of transistor 53 will be forward biased, thereby reverse-biasing the emitter-base junction of transistor 53 and causing the output of the multivibrator circuit obtained from the emitter of transistor 53 to be in a relatively negative state. At the same time, conduction of the transistor 52 causes a current to flow through the capacitor 56 in the diode 55 to cause the base of transistor 50 to become negative thereby causing it to become non-conductive. The collector of transistor 50 will therefore be positive and will forward-bias the base-emitter junction of transistor 51 to cause the emitter of transistor 51 to be at a relatively positive output state. As charge builds up on the capacitor 56 to forward bias the emitter-base junction of transistor 50, it will conduct and the transistor 51 will be shut off, thereby coupling a negative pulse through the capacitor 57 to shut off the transistor 52. The width of the output pulses in time is determined by the capacitors 56 and 57 and their associated resistive networks; and the potentiometer 59 provides an adjustment for obtaining equal time periods for positive and negative output pulses.

The addition of the emitter followers 51 and 53 to the multivibrator circuit 20 makes it susceptible to hanging up (i.e. non-oscillatory mode) when power is initially applied; in such cases, momentary closing of the switch 54 will start the multivibrator by turning off the transistor 50. A self-starting circuit could easily be incorporated into the system; however, it may be useful in some cases to include the switch 54 which, when maintained a closed position will provide a dc output from the multivibrator circuit 20 and therefore into the bridge 10 for comparison purposes.

As already mentioned the output of the multivibrator circuit 20 is fed to the current amplifier 21 which includes two transistors 60 and 61 connected in common-emitter configuration with their bases connected directly together and receiving the input pulse. These transistors act as current amplifiers or isolation circuits to prevent loading of the multivibrator circuit. The output of the current amplifier 21, taken from the commonly connected emitters of the transistors 60 and 61 is connected to the movable arm of the potentiometer 22.

Connected in series with the potentiometer 22 and with the previously-described resistors 23 and 24 are the two variable resistors 62 and 63. The resistors 62 and 63 are mounted on a common shaft so that their effective resistance changes in the same direction and by the same amount upon rotation of the shaft. The junction between the transistor 23 and the variable resistor 62 is connected to the negative clamping circuit (enclosed within the dashed line 25a)— that is, to one input of an operational amplifier 64. The other input of the operational amplifier 64 is connected to ground, and the two inputs are coupled together by means of a pair of diodes as illustrated to protect the amplifier inputs from excessive signals under fault conditions. The output of the amplifier 64 is connected to the base of an NPN transistor 64a having its collector connected to ground. The emitter of the transistor 64a is connected to the anode of the previously-described diode 26; and the cathode of the diode 26 is connected to the bases of the transistors 60 and 61 of the current amplifier 21.

In a similar arrangement for the positive clamping circuit (dashed line 27a), the junction between the resistor 24 and the variable resistors 63 is connected to one input of an operational amplifier 65, and the other input is connected to ground. The output of the amplifier 65 is coupled to the base of a PNP transistor 65a having its collector connected to ground and its emitter connected to the cathode of the diode 28. The anode of the diode 28 is connected to the input of the current amplifier 21.

In operation for clamping the negative voltage output of the multivibrator circuit 20, it will be appreciated that the voltage divider network including the potentiometer 22, the variable resistor 62 and the fixed resistor 23 feed a voltage into summing junction 64b, which may be expressed as $V_B \cdot R_{23}/R_p - V_{15}$, in which $V_{15}$ is the voltage at bridge node 15, and $V_B$, $R_{23}$ and $R_p$ have been previously defined. The signal at the summing junction 64b is compared with reference ground (which is applied to the non-inverting input to amplifier 64). Since the signal at the summing junction 64b is connected directly to the inverting input of amplifier 64, the output of amplifier 64 will change from a negative to a positive voltage when the voltage at bridge node 15 becomes more negative than $-V_B \cdot R_{23}/R_p$. The output of amplifier 64 then forward biases the base of transistor 64a, so that current can flow through transistor 64a and diode 26 to prevent further negative excursion of the input to current amplifier 21a, thus preventing further negative excursion of the output of amplifier 21a, which is the voltage applied to bridge node 15. Positive clamping is achieved by a similar action performed by clamping amplifier 65 with the associated transistor 65a and diode 28, under control of the resistors 22, 63 and 24 determining the voltage applied to the summing junction of amplifier 65. The resistors 62 and 63 are preferably ganged as shown to insure positive and negative symmetry of the output voltage. The potentiometer 22 provides fine tuning for this symmetry.

The output of the current amplifier 21, as already described, is fed to the power terminal 15 of the bridge circuit 10. The signal terminals 17 and 18 are shown as feeding the previously-described operational amplifier 33 which drives the current amplifier 34 which is shown in the FIG. 3 as enclosed within the dashed line 34a comprising two Darlington pairs connected in series, the output of which feeds the other power terminal 16 of the bridge 10. The output unbalance signal taken from the bridge 10 is fed through suitable resistive networks to the operational amplifier 36 connected as a differential amplifier — that is, it amplifies the difference in amplitude between the signal at the nodes 17 and 18 respectively of the bridge circuit 10. The output of the amplifier 36 is connected to the primary of the transformer 37 in the manner previously described, and the center-tapped secondary feeds the switching transistors 38 and 41 respectively. One output of the multivibrator circuit 20 taken from the emitter of transistor 53 is connected to the cathode of a diode 68, the anode of which is connected through a capacitor 69 to ground. The cathode of the diode 68 is also connected through a resistor 70 the anode of a diode 71, the cathode of which is connected to the anode of diode 68. The junction between the resistor 70 and the diode 71 is resistively coupled to the gate lead of the switch 38.

Similarly, the gate lead of the switch 41 is resistively connected to the anode of a diode 73 which has its cathode connected to the anode of a second diode 74 as well as to a capacitor 75. The cathode of diode 74 is connected by means of resistor 76 to the anode of the diode 73 and directly to the emitter of the transistor 51 of a multivibrator circuit 20. It will be recalled from previous description that the switches 38 and 41 are alternately triggered to couple the output of the differential amplifier 36 to a common terminal of the filter capacitor 39 so as to demodulate the output signal from the bridge 10. Thus, when the emitter of the transistor 53 goes positive the diode 68 is reverse biased and the signal is coupled through the resistor 70 to forward bias the diode 71. However, the capacitor 69 delays the positive swing of the output signal momentarily until charge builds up on the capacitor 69 to forward bias the switch 38. Similarly, in the alternate half cycle of the multivibrator circuit there will be a delay (dependent upon the time constant of the resistor 76 and capacitor 75) before the switch 41 will start to conduct. When the emitter of transistor 53 goes negative, the polarity. 70 is bypassed by the diode 68 so that the switch 38 is shut off immediately. Thus, each of the demodulating switches is delayed in turning on, but it is turned off immediately. The delay in turning the switch on allows the feedback circuitry including the amplifier 33 and current amplifier 34 to react to the change in state of the bridge power voltage to eliminate the common mode signal, as already described. That is, in order to reduce the effect of the transients during the zero crossing of the bridge supply voltage, the "on" drive to the demodulator switches is delayed about 100 microseconds, but the turning off of the switches is not delayed because of the bypass diodes. As a result, the demodulator operates at about 80 percent efficiency, reducing the overall gain of the system to about 80. Ripple resulting from operation under these conditions is filtered out by the capacitor 39, and the filtered output may be connected to a conventional attenuator and dc servo-recorder, if desired.

A frequency of about 1,000 Hz was selected for the multivibrator circuit 20, but the operating frequency is not critical. The selected frequency is high enough to reduce flicker noise to insignificant levels, yet low enough to avoid serious distortion of wave shapes by stray capacitance and limitations of amplifier bandwidth.

The system described above was evaluated by testing its response with air samples. Common ionization detectors are insensitive to the detection of permanent gases such as oxygen, nitrogen and carbon dioxide. The system has a detection limit representing an elution of 0.2 microliters of air in a 10 microliter sample of helium with a helium flow rate of 45 milliliters per minute. Gas samples of 1 milliliter may be accepted by a column of one-fourth in. by 6 feet without overloading with the major compound. In a sample of this size, trace components can be reliably analyzed at concentrations down to 10 parts per million, with a detection limit of the order of 0.5 parts per million in the sample or 0.1 parts per million in the effluent.

Figure 4:
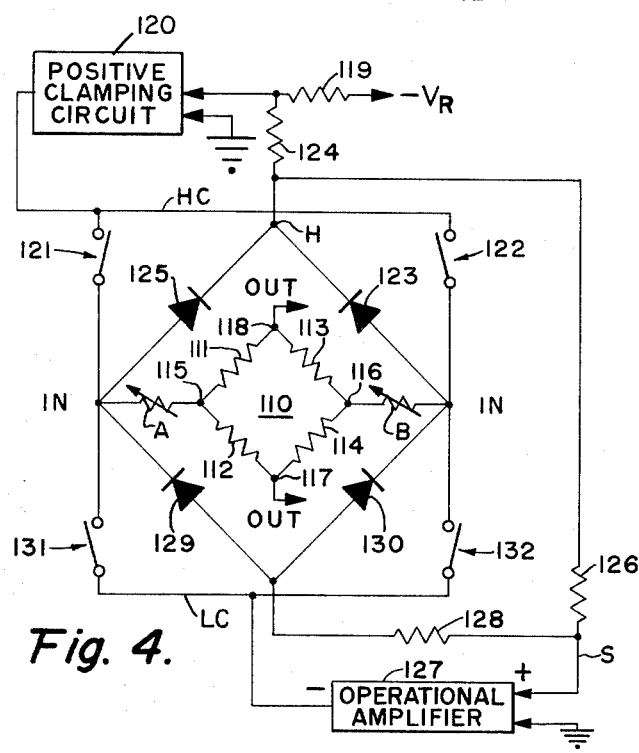
FIG. 4 is a circuit schematic diagram of a modification for exciting the bridge circuit.

Turning now to FIG. 4, there is shown a modification for energizing the bridge circuit to eliminate the common mode signal. Rather than applying a square wave directly to the bridge, switches are used to alternately connect the bridge power terminals between two known fixed dc levels, which may be adjusted or controlled but when once set remain constant.

The bridge in FIG. 4 is designated by reference numeral 110, and the fixed resistors are labeled 111 and 112. The sensing elements are designated 113 and 114 and the power nodes are designated 115 and 116. To increase the bridge output, fixed resistors 111 and 112 may be replaced by a second pair of sensing elements (one being a reference and the other a measuring sensor). The output terminals are designated 117 and 118. Because the sensing circuitry may be the same as has already been described, it need not be further described here. A positive clamping circuit 120, similar to the clamping circuits already described, has the inverting input connected through a resistor 119 to the negative terminal of a reference power supply (which may be derived from the negative power supply bus $-V_B$). The other, non-inverting input to clamping circuit 120 is connected to reference ground.

The output of the clamping circuit 120 (a node designated HC for "high clamp") is connected by means of a first switch 121 to the terminal 115 of the bridge circuit and by means of a switch 122 to the terminal 116 of the bridge circuit. The terminal 116 of the bridge circuit is also connected to the anode of a diode 123, the cathode of which is connected via a resistor 124 to the signal input terminal of the operational amplifier of the positive clamping device 120. The bridge power terminal 115 is also connected to the anode of a diode 125, the cathode of which is connected to the junction between the resistor 124 and the cathode of the diode 123. The cathodes of diodes 123 and 125 are connected by means of a resistor 126 to the signal input of an inverting operational amplifier 127. This input is also connected by means of a resistor 128 to the anodes of two diodes 129 and 130, the cathodes of which are connected respectively to the bridge terminals 115 and 116. The output of the amplifier 127 (denoted LC for low or negative clamp) is connected by means of switches 131 and 132 respectively to the bridge terminals 115 and 116.

The switches 121, 122, 131 and 132 are arranged so that the pair 121, 132 open and close together but in mutually exclusive operation relative to the pair of switches 122, 131, which also actuate in unison. That is, when the first pair are closed, the second pair are open, and vice versa.

In operation of the circuit of FIG. 4, it will be observed that the bridge power terminals 115 and 116 are connected by means of the diodes 123 and 125 to the negative reference voltage via resistors 124 and 119 so that the input to the clamping circuit 120 is fed by a voltage divider network energized by whichever of the power terminals 115, 116 is connected to a positive voltage. The output of the clamping circuit 120 therefore provides a positive, clamping level which may be adjusted by varying the reference voltage $-V_R$. If the switch 121 is closed then the clamped positive voltage is fed to the node 115 of the bridge (and through the diode 125 to supply the resistive divider network). Alternatively, if the switch 121 is open, the switch 122 is closed so that the positive clamp voltage is applied to the other power terminal of the bridge circuit 116. The junction between the resistors 126 and 128, labeled S, represents a summing junction receiving respectively the high and low voltage inputs to the bridge power terminals 115 and 116. Thus, the operational amplifier 127 acts as a common mode rejection amplifier to maintain the sum of voltages at the nodes 115 and 116 equal to zero volts at all times. The maximum sensitivity of the bridge 110 will be obtained if at balance the resistance arms 111 and 113 are made equal to resistance arms 112 and 114 respectively. Under those conditions, the common mode voltage at the bridge output nodes 117 and 118 become zero if the voltages applied to the power nodes 115 and 116 are made equal and opposite, which may be achieved by the operation of clamping amplifier 127 in combination with resistors 126 and 128, as described above. In practice, the matching of the bridge arms 111—114 is often close enough to reduce common mode signals at the bridge output nodes 117 and 118 to acceptable levels (less than 10 mV) by this means. Where necessary, a residual common mode signal due to slight differences in the bridge arm resistance may be further reduced by adjustment of small variable resistors A and B inserted as shown in FIG. 4. This design has the advantage over the one described previously in that neither the amplifier 120 nor the amplifier 127 need amplify ac signals. They only have to maintain the steady state signals at the switches which they feed. Therefore, they can be low frequency amplifiers, and specifications such as transient response and stray capacitance may be relaxed.

Figure 5:
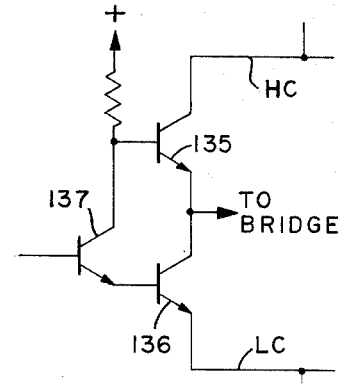
FIG. 5 is a circuit schematic diagram of circuitry for actuating the switches shown schematically in the modification of FIG. 4.

Turning now to FIG. 5, there is shown a circuit which may be used to effect the operation of the switches 121 and 131. A similar circuit may be used to effect the switches 122 and 132 of FIG. 4. The output of the clamping circuit 120 is connected to the collector of a transistor 135, the emitter of which is connected to the power terminal 115 of the bridge circuit and to the collector of a second transistor 136. The emitter of transistor 136 is connected to the output of the amplifier 127. The base of the transistor 135 is connected to the collector of a transistor 137 and the emitter of the transistor 137 is connected to the base of the transistor 136. The base of the transistor 137 is connected to the output of a multivibrator circuit. The collector of the transistor 137 is also connected to a positive bias supply via a resistor. When the multivibrator input to the base of the transistor 137 is positive, the transistor 137 will conduct and thereby cause the transistor 136 to conduct, the emitter of transistor 136 being connected to a relatively negative voltage. The transistor 135 will be in a nonconducting state because its emitter-base junction is reverse biased. When, however, the input from the multivibrator goes negative the transistor 137 will be reverse biased and thereby removes base current from the transistor 136. The base of the transistor 135 will then be positive and that transistor will be in a conducting state to connect the node to the bridge input 115. A similar technique may be used to implement the switches 122 and 132 of the circuit of FIG. 4. It should be noted that because the operation of the clamping amplifiers 120 and 127 described above is controlled by the voltages appearing at the bridge nodes 115 and 116, as sensed via diodes 123, 125, 129, and 130, the clamping voltages at lines HC and LC will be controlled to allow for any voltage drop appearing across the switching transistors 135 and 136 and their counterparts connected to the bridge power node 116.

Having thus read in detail a preferred embodiment of the inventive system, persons skilled in the art will be able to substitute certain elements for those which have been illustrated and to modify the operation of the system while continuing to practice the inventive principle; and it is, therefore, intended that all such modifications and substitutions be covered as they are embraced within the spirit and scope of the appended claims.

I claim

1. In a measuring system, the combination comprising: a bridge circuit including at least one reference thermally responsive element and a measuring thermally responsive element associated with each reference element, said bridge circuit having a pair of power nodes and a pair of output nodes; power means exciting a first of said power nodes of said bridge circuit with pulses of generally constant magnitude and alternating polarity; and feedback circuit means responsive to the common mode signal of said bridge for energizing the other of said power nodes of said bridge with pulses of a magnitude equal to the magnitude of the pulses energizing said first power node and having a polarity opposite to the pulses at said first node thereby to minimize the common mode signal to said bridge power nodes.

2. The system of claim 1 wherein said feedback circuit means for energizing the other of said power nodes includes summing circuit means responsive to the signal at the output signal nodes of said bridge circuit for generating a signal representative of the sum of said signals at the output nodes, said signal also being representative of the common mode signal to said bridge from said power means; and inverting amplifier means responsive to said summed signal for energizing said second power node of said bridge circuit with a signal of equal magnitude with the signal energizing said first power node and of opposite polarity.

3. The system of claim 1 further comprising clamping circuit means for clamping respectively the positive and negative voltage signals supplied to said first power node of said bridge circuit.

4. The system of claim 1 further comprising sensing circuit means responsive to the signals at the output nodes of said bridge circuit for generating a signal representative of the difference between said signals at said output nodes.

5. The system of claim 4 wherein said sensor means includes a differential amplifier responsive to the signals at the output nodes of said bridge, first and second switch means connected in circuit with the output signal of said differential amplifier, and delay circuit means for alternately actuating said switches to invert alternate half-cycles thereof a predetermined time after said power means has changed polarity.

6. In a system for measuring the thermal conductivity of a unknown fluid including at least one reference thermal conductivity detector immersed in a carrier fluid and a measuring thermal conductivity detector associated with each reference detector and immersed in a mixture of the carrier fluid and the unknown fluid, the improvement comprising: bridge circuit means including said measuring and said reference detectors for generating a signal representative of the difference in resistance between said detectors when said bridge circuit is energized, said bridge circuit having first and second power nodes for being energized; first source means for energizing one of said power nodes of said bridge circuit with a periodic voltage with alternate half cycles of generally constant magnitude relative to a reference voltage and opposite polarity; and second source means for energizing said second power terminal with a second periodic voltage synchronized with said first periodic voltage and of opposite polarity than said first periodic voltage, said second source means including feedback circuit means responsive to the common mode voltage fed to said bridge circuit for adjusting the magnitude of the voltage of said second source means to be equal to the magnitude of said first source means relative to said reference voltage.

7. In a system for measuring the thermal conductivity of an unknown gas including at least one reference thermal conductivity detector immersed in a carrier gas and a measuring thermal conductivity detector associated with each reference detector and immersed in a mixture of the carrier gas and the unknown gas, the improvement comprising: bridge circuit means including said measuring and said reference detectors for generating a signal representative of the difference in resistance between said detectors when said bridge circuit is energized, said bridge circuit having first and second power nodes for being energized; first source means including a multivibrator circuit for energizing one of said power nodes of said bridge circuit with a periodic voltage with alternate half cycles of constant magnitude and opposite polarity; and second source means including summing means summing the signal present at the output terminals of said bridge circuit and feedback means responsive to said summed signal for energizing the second power node of said bridge circuit with a second periodic voltage synchronized with said first periodic voltage and of opposite polarity, said feedback means being responsive to the summed signal of said signal node to vary the magnitude of the voltage at said second power node to be equal to the magnitude of the voltage at said first power node.

8. In a system for measuring the thermal conductivity of an unknown gas including at least one reference thermal conductivity detector immersed in a carrier gas and a measuring thermal conductivity detector associated with each reference detector and immersed in a mixture of the carrier gas and the unknown gas, the improvement comprising: bridge circuit means including said measuring and said reference detectors for generating a signal representative of the difference in resistance between said detectors when said bridge circuit is energized, said bridge circuit having first and second power nodes for being energized; first source means for generating a first clamped voltage of one polarity; second source means for generating a second clamped voltage of opposite polarity than the first clamped voltage; switching circuit means for alternately connecting said first clamped voltage to said first and second power nodes of said bridge periodically and for alternately connecting said second clamped voltage to said second and said first power nodes of said bridge periodically and mutually exclusively with the connection of said first clamped voltage; and summing circuit means sensing the sum of voltages applied to said bridge by one of said source means for adjusting the magnitude of the other of said source means to be equal to the magnitude of said first source means and thereby to substantially reduce the common mode signal fed to said bridge power nodes.

9. In a measuring system, the combination comprising: a bridge circuit including at least one reference thermally responsive element and a measuring thermally responsive element, said bridge circuit having first and second power nodes and first and second output nodes; a first pair of switching circuits for selectively connecting said first and second power nodes of said bridge circuit respectively to a high clamp node and a low clamp node when actuated; a second pair of switching circuits for selectively connecting said first and second power nodes of said bridge circuit respectively to said high clamp node and said low clamp node when actuated; means for actuating said first and second pairs of switches to operate mutually exclusively, whereby said first and second power nodes of said bridge circuit are coupled alternately to said high and low clamp nodes; clamping circuit means for calmping one of said high clamp and low clamp nodes to a predetermined constant voltage; summing circuit means for generating a signal representative of the common mode signal of said bridge circuit; and feedback circuit means responsive to said summing circuit means for energizing the other of said high clamp and low clamp nodes with a signal of opposite polarity while minimizing the common mode signal supplied to said bridge.

* * * * *